US010257477B2

(12) United States Patent
Richards et al.

(10) Patent No.: US 10,257,477 B2
(45) Date of Patent: *Apr. 9, 2019

(54) MULTI-HALF-TONE IMAGING AND DUAL MODULATION PROJECTION/DUAL MODULATION LASER PROJECTION

(71) Applicant: DOLBY LABORATORIES LICENSING CORPORATION, San Francisco, CA (US)

(72) Inventors: Martin J. Richards, Redwood City, CA (US); Jerome Shields, Lumberton, NJ (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/890,133

(22) PCT Filed: Apr. 14, 2014

(86) PCT No.: PCT/US2014/034010
§ 371 (c)(1),
(2) Date: Nov. 9, 2015

(87) PCT Pub. No.: WO2014/182404
PCT Pub. Date: Nov. 13, 2014

(65) Prior Publication Data
US 2016/0119599 A1 Apr. 28, 2016

Related U.S. Application Data

(60) Provisional application No. 61/820,680, filed on May 7, 2013, provisional application No. 61/820,683, filed on May 7, 2013.

(51) Int. Cl.
*H04N 9/31* (2006.01)
*G09G 3/00* (2006.01)
(Continued)

(52) U.S. Cl.
CPC .......... *H04N 9/3126* (2013.01); *G09G 3/002* (2013.01); *G09G 3/2033* (2013.01); *G09G 3/346* (2013.01); *H04N 5/04* (2013.01); *H04N 9/3161* (2013.01)

(58) Field of Classification Search
CPC .. H04N 9/3126; H04N 9/3155; H04N 9/3161; H04N 9/3164
See application file for complete search history.

(56) References Cited

U.S. PATENT DOCUMENTS 5,751,264 A 5/1998 Cavallerano
5,978,142 A 11/1999 Blackham
(Continued)

FOREIGN PATENT DOCUMENTS

CN 1645242 7/2005
CN 1879057 12/2006
(Continued)

OTHER PUBLICATIONS

Gladysz, S. et al "Size of the Halo of the Adaptive Optics PSF" Adaptive Optics Systems III, Proc. of SPIE, vol. 8447, Jul. 2012.
(Continued)

*Primary Examiner* — Bao-Luan Q Le

(57) ABSTRACT

Smaller halftone tiles are implemented on a first modulator of a dual modulation projection system. This techniques uses multiple halftones per frame in the pre-modulator synchronized with a modified bit sequence in the primary modulator to effectively increase the number of levels provided by a given tile size in the halftone modulator. It addresses the issue of reduced contrast ratio at low light levels for small tile sizes and allows the use of smaller PSFs which reduce halo artifacts in the projected image and may be utilized in 3D projecting and viewing.

20 Claims, 5 Drawing Sheets

(51) Int. Cl.
  *G09G 3/20* (2006.01)
  *G09G 3/34* (2006.01)
  *H04N 5/04* (2006.01)

(56) References Cited

U.S. PATENT DOCUMENTS

| | | | |
|---|---|---|---|
| 5,986,640 A * | 11/1999 | Baldwin | G09G 3/2033 |
| | | | 345/596 |
| 6,215,469 B1 | 4/2001 | Mori | |
| 6,466,225 B1 | 10/2002 | Larkin | |
| 6,529,204 B1 | 3/2003 | Mikoshiba | |
| 6,629,746 B2 | 10/2003 | Waldner | |
| 6,927,890 B2 | 8/2005 | Allen | |
| 7,002,533 B2 | 2/2006 | Sayag | |
| 7,050,122 B2 * | 5/2006 | Gibbon | H04N 5/20 |
| | | | 348/678 |
| 7,064,740 B2 | 6/2006 | Daly | |
| 7,245,327 B2 | 7/2007 | Willis | |
| 7,403,332 B2 | 7/2008 | Whitehead | |
| 7,551,341 B1 * | 6/2009 | Ward | G03B 33/08 |
| | | | 359/248 |
| 7,575,327 B2 * | 8/2009 | Uchiyama | G09G 3/002 |
| | | | 349/7 |
| 7,609,235 B2 | 10/2009 | Thebault | |
| 7,683,919 B2 * | 3/2010 | Asahi | G09G 3/346 |
| | | | 345/204 |
| 7,753,530 B2 | 7/2010 | Whitehead | |
| 8,125,702 B2 * | 2/2012 | Ward | G03B 33/08 |
| | | | 359/248 |
| 8,217,970 B2 | 7/2012 | Whitehead | |
| 8,297,759 B2 | 10/2012 | Quinn | |
| 8,493,313 B2 | 7/2013 | Damberg | |
| 8,531,492 B2 | 9/2013 | Wallener | |
| 8,542,408 B2 * | 9/2013 | Lieb | G09G 3/007 |
| | | | 345/589 |
| 8,593,579 B2 * | 11/2013 | Ishino | G03B 33/12 |
| | | | 348/751 |
| 8,890,910 B2 | 11/2014 | Messmer | |
| 9,022,582 B2 * | 5/2015 | Kang | H04N 9/3117 |
| | | | 353/99 |
| 9,135,864 B2 | 9/2015 | Shields | |
| 9,154,752 B2 * | 10/2015 | Kobayashi | H04N 9/3126 |
| 9,202,418 B2 * | 12/2015 | Goerzen | G09G 3/3413 |
| 2004/0001184 A1 * | 1/2004 | Gibbons | H04N 5/20 |
| | | | 353/31 |
| 2005/0151934 A1 | 7/2005 | Akutsu | |
| 2005/0190140 A1 * | 9/2005 | Asahi | G09G 3/346 |
| | | | 345/100 |
| 2005/0195223 A1 | 9/2005 | Nitta | |
| 2006/0119796 A1 * | 6/2006 | Drazic | G02B 13/0095 |
| | | | 353/31 |
| 2008/0007514 A1 | 1/2008 | Tanaka | |
| 2008/0018466 A1 | 1/2008 | Batra | |
| 2008/0158245 A1 * | 7/2008 | Lieb | G09G 3/007 |
| | | | 345/596 |
| 2008/0158672 A1 * | 7/2008 | McCosky | H04N 13/0431 |
| | | | 359/464 |
| 2008/0180466 A1 | 7/2008 | Whitehead | |
| 2008/0192155 A1 * | 8/2008 | Uchiyama | G09G 3/002 |
| | | | 349/8 |
| 2009/0161029 A1 * | 6/2009 | Sakaguchi | H04N 9/3126 |
| | | | 348/751 |
| 2009/0225234 A1 * | 9/2009 | Ward | G03B 33/08 |
| | | | 348/744 |
| 2009/0262261 A1 * | 10/2009 | Ishino | G03B 33/12 |
| | | | 348/744 |
| 2009/0322800 A1 | 12/2009 | Atkins | |
| 2010/0091045 A1 * | 4/2010 | Heidrich | G09G 3/3426 |
| | | | 345/690 |
| 2010/0315441 A1 | 12/2010 | Kang | |
| 2011/0205494 A1 * | 8/2011 | Richards | G02B 5/20 |
| | | | 353/7 |
| 2011/0292289 A1 * | 12/2011 | Kobayashi | H04N 9/3126 |
| | | | 348/607 |
| 2012/0038693 A1 * | 2/2012 | Kang | H04N 9/3117 |
| | | | 345/691 |
| 2012/0092360 A1 | 4/2012 | Kang | |
| 2012/0120096 A1 | 5/2012 | Johnson | |
| 2012/0212487 A1 | 8/2012 | Basler | |
| 2014/0204134 A1 * | 7/2014 | Goerzen | H04N 9/3105 |
| | | | 345/697 |

FOREIGN PATENT DOCUMENTS

| | | |
|---|---|---|
| JP | 2005-196215 | 7/2005 |
| KR | 10-2008-0010820 | 1/2008 |
| KR | 10-1225574 | 1/2013 |
| RU | 2440623 | 1/2012 |
| WO | 2009/073187 | 6/2009 |
| WO | 2012/125756 | 9/2012 |

OTHER PUBLICATIONS

Shin, H. et al "Rendering High Dynamic Range Images by Using Integrated Global and Local Processing" Optical Engineering, vol. 50, No. 11, Nov. 2011, SPIE—The International Society for Optical Engineering.

* cited by examiner

MULTI-HALF-TONE IMAGING AND DUAL MODULATION PROJECTION/DUAL MODULATION LASER PROJECTION

CROSS REFERENCE TO RELATED APPLICATIONS

This application is the 371 National Stage Entry of (and takes benefit of) PCT/US2014/034010 filed on Apr. 14, 2014 and also claims benefit of priority to U.S. Provisional Patent Applications Nos. 61/820,680 and 61/820,683, both filed on May 7, 2013; wherein the disclosures of these references are incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to display devices and more particularly to dual modulation projectors (including laser projectors) and the creation of half-tone images in a pre-modulator of the projector.

Discussion of Background

Dual modulation projectors and displays include display devices (e.g., Whitehead U.S. Pat. No. 7,403,332, and Daly U.S. Pat. No. 7,064,740) and projectors (e.g., Sayag U.S. Pat. No. 7,002,533).

SUMMARY OF THE INVENTION

The present inventors have realized the need for improved half-toning of pre-modulator images. The invention allows the use of smaller halftone tiles on the first modulator of a dual modulation projection system. This techniques uses multiple halftones per frame in the pre-modulator synchronized with a modified bit sequence in the primary modulator to effectively increase the number of levels provided by a given tile size in the halftone modulator. It addresses the issue of reduced contrast ratio at low light levels for small tile sizes and allows the use of smaller PSFs which reduce halo artifacts in the projected image. The half toning may also be utilized to improve projection of color or polarization separated 3D imagery.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

The present inventor has realized the need to increase contrast and brightness of projection displays and to reduce artifacts. The present invention includes generation of a digital PSF. The digital PSF may be, for example, a digital PSF of a modulated light source to illuminate a modulator of a projector or other display. The illuminated modulator may be, for example, a primary (or final) modulator of a dual modulation projection system, an intermediary modulator of a multimodulation system, or, alternatively, any other modulator within a projection or display system.

The digital PSF provides, for example, a PSF of any of a pixel, tile, or other area of a pre-modulator image or other lighting illuminating the primary (or other) modulator that is configurable to account for variations, discontinuities, aberrations, or other non-uniformities in a light path between the pre-modulator and primary modulator such that a uniform PSF is exhibited at the primary modulator. The digital PSF may be utilized to assure a consistent PSF among all pixels (or any group of pixels) in an image, image path, or as illuminated on the primary modulator.

In one embodiment, the present invention provides a dual modulation projector containing a pre modulator, relay optics, and a primary modulator, and where pre-compensation for imperfections of the relay optics PSF is made by modifying the image sent to the pre modulator (pre-modulator image). The result is a desired uniformity and/or shape of the light illuminating the primary modulator.

The desired uniformity and/or shape of the light illuminating the primary modulator may be different for different portions of the image. The pre-compensation may be a filter that is different for different regions of the image. The resulting PSF of pixels of the light illuminating the primary modulator may be flatter in areas of the image having predominately lower spatial frequencies, and the resulting PSF of pixels of the light illuminating the primary modulator may be sharper in areas of the image having predominately higher spatial frequencies. The PSFs may be different based on wavelengths of light being modulated. In one embodiment, all PSFs in a region of the image have similarly shaped PSFs when illuminating a corresponding area of the primary modulator. The shapes of the same lights may be different before transfer optics or other optical elements in the light path between modulators, the differences being pre-compensation that adjusts the light to account for how the different lights change enroute to the primary modulator. Ideally, the compensation is different for each wavelength of light which reacts differently to different optical elements within the light path.

The pre-compensation filter may include coefficients are calculated based upon PSF measurements and a reference desired PSF.

Additional compensation is made by the primary modulator. The additional compensation includes, for example, compensation to further modulate the light illuminating the primary modulator into the desired image. The additional compensation may also include compensation for a PSF of one or more pixels.

The pre-modulator may be, for example, a DMD "displaying" a halftone image. The primary modulator may also be a DMD. The invention may be implemented on combinations of reflective and transmissive modulators with any of polarizers, reflectors, dichroics, PBSs, or other optical elements as relay optics between the modulators. The pre-modulator itself may be illuminated by any combination of broadband light sources, narrowband light sources, modulated light sources. Preferably, the pre-modulator is illuminated by a laser light source that is at least globally dimmed and may include some form of local dimming (or spatial modulation) to further increase contrast.

The invention includes a half-tone or other image on a pre-modulator that is changed multiple times per frame, and where bit sequences that energize the pre-modulator for each of those multiple times per frame are synchronized with corresponding energization signals of the primary modulator. The invention includes a pre-modulator DMD energized with a halftone image and a primary modulator DMD. The pre-modulator's half-tone image is changed multiple times per frame, and where the bit sequences on the pre-modulator DMD the primary modulator DMD are synchronized, such that an average across the frame is the product of an average of the pre-modulator images through the relay optics and the primary modulator image. In various embodiments, the pre-modulator half tone image is changed any of twice, three times, four times, and eight times or more per frame. The number of times per frame that the pre-modulator image may change may be variable, such that, for example, for some frames the pre-modulator image is changed twice per frame, and for other frames it is changed 4 times per frame. The number of pre-modulator half-tone changes may be updated when transitioning between 2D and 3D projection modes or transitioning between single and dual projector modes, or utilizing additional projectors. The number of halftone changes may be changed when transitioning between different environments. The number of half tone changes may be different for different projectors and/or similar projectors in different environments, for example when displaying cinema content to riders in a theme park ride as they transition from scene to scene in different portions of the ride that may utilize different projectors or a plurality of similar projectors in different environments.

The DMDs are synchronized such that the average across the frame is the product of the average of the pre-modulator images through the relay optics and the primary modulator image.

In one embodiment, the pre-modulator half-tone image is changed three or more times per frame and in synchronization with the final modulator image that is changed at least once per frame.

The present invention includes a method of energizing a pre-modulator, comprising the steps of:
1) Obtaining a 2D PSF of relay optics or other non-uniformities in a light path between the pre-modulator and a primary modulator.
2) Calculating a correction factor comprising difference between a desired PSF and the 2D PSF;
3) Applying the correction factor to a pre-modulator image; and
4) Energizing the pre-modulator with the corrected pre-modulator image.

The invention allows the use of less than optimal point spread (PSF) functions in the optics between the pre-modulator and primary modulator of a dual modulation projection system. This technique uses multiple halftones per frame in the premodulator synchronized with a modified bit sequence in the primary modulator to produce a compensation image that reduces the errors produced by the sub-optimal PSF.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 5:
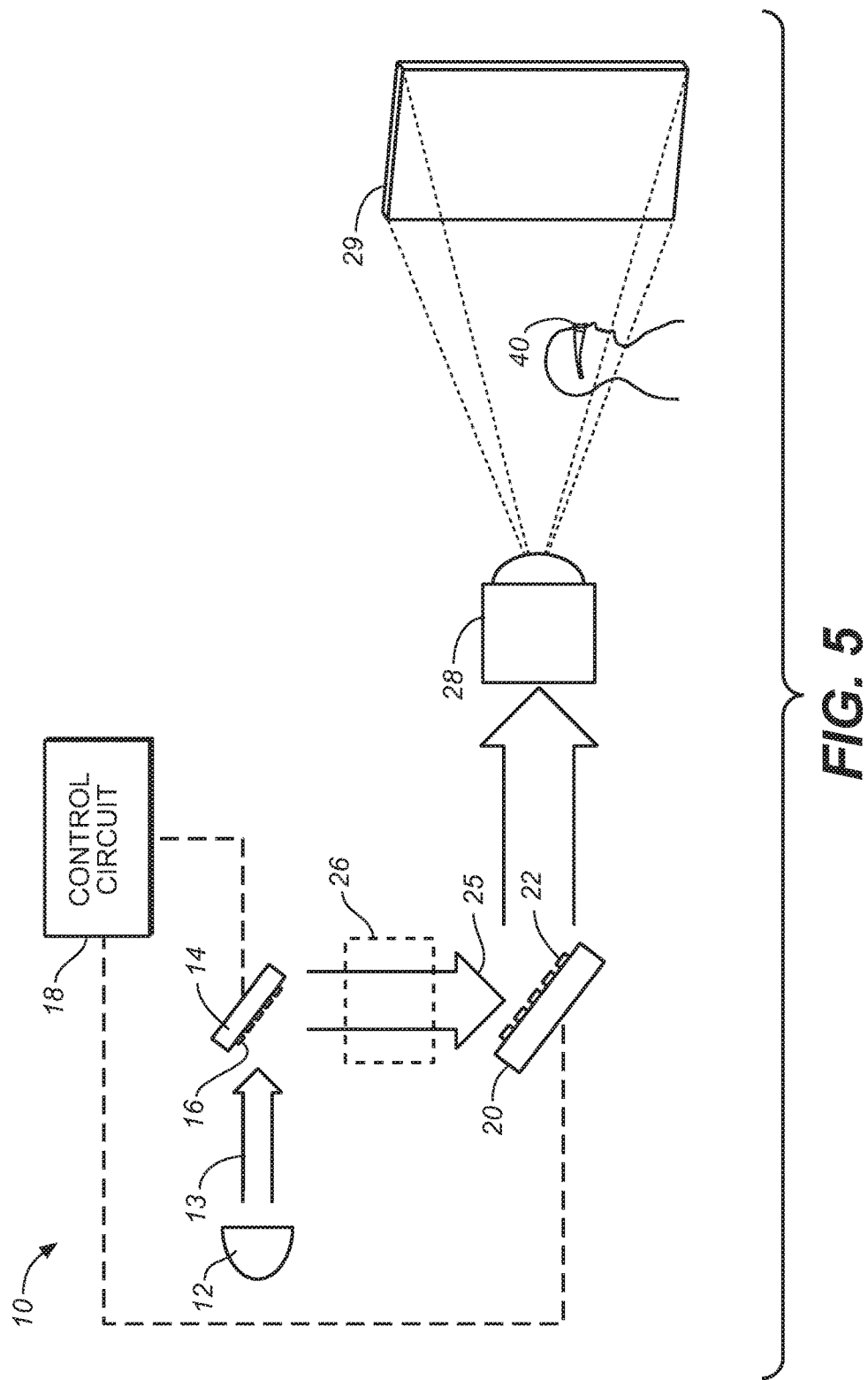
FIG. 5 is a schematic diagram of a dual modulation display.

FIG. 5 shows schematic diagram of a dual modulation display. Display 10 comprises a light source 12. Light source 12 may comprise may comprise, for example: a laser; a xenon lamp; an array of laser diodes or other solid-state light emitters; an arc lamp; or the like. Alternatively, light source 12 may comprise at least 2 sets of light wavelengths each set comprising red, green, and blue wavelength lights wherein at least one of the same color wavelengths in different sets are separated by a minimum bandwidth necessary to accomplish off-axis viewing without cross-talk through passbands of viewing glasses at normal and off-axis viewing encountered in a standard cinema theater or cinema presentation at a theme park or as part of a theme park ride. The off-axis viewing may be one of approximately 20 degrees and not more than 20 degrees, and a max angle normally encountered in the presentations.

Light 13 from light source 12 illuminates a first spatial light modulator 14. First spatial light modulator ("Pre-Modulator") 14 comprises a plurality of controllable elements 16. First spatial light modulator 14 may comprise a MEMS or a DMD in some embodiments. Second spatial light modulator ("Primary Modulator") 20 may comprises a plurality of controllable elements 22, accepting light 25 from the pre-modulator (through a set of relay optic elements 26). Controller 18 sends control signals (e.g., energization signals) to both premodulator and primary modulator, wherein the dual modulation energization signals may comprise a pre-modulator energization signal comprising more than one half-tone image each to be displayed or energized on a pre-modulator of a dual modulation display system during a single frame time period in synchronization with a primary modulator signal comprising an image to be displayed or energized on a primary modulator of the dual modulation display system. Further, the half-tone images may be generated via tiles on the pre-modulator, wherein each tile comprises an array of modulating elements—e.g., wherein each tile may comprise a n×n array of mirrors.

Light from the primary modulator may be transmitted through a projector lens 28 and projected on screen 29. The image on screen 29 may be viewed by a viewer wearing active glasses 40 (e.g., configured for 3D viewing). User may be sitting in a theater and viewing the image on screen 29 at some off-axis angle.

The current dual modulation POC EDR projector uses a single half tone image per frame on the pre-modulator. To limit halo size on small bright features and to achieve high local contrast, a small PSF is desirable. The first nonzero premod level is achieved by superimposing a field of PSFs to achieve a relative flat light field. For a given (small) PSF size, the spacing of the half-tone non-zero pixels must be smaller than the PSF, and small enough to achieve this flat field. This limits the percentage of pixels that must be non-zero to a certain level, and this determines the first nonzero average level, and the number of discrete linear pre-modulation levels. For example, a PSF that must be repeated on a 5×5 grid will require 1 of 25 pre-modulator pixels to be turned on, resulting in a minimum 1/25 non-zero level, and 25 discrete premod levels.

The image from the system described can have about 25× the contrast ratio (CR) of the primary modulator; if the original CR of the primary modulator was 1800, then the final image could have CRs of 45,000:1. This assumes that 1 of 25 pixels are always on. Since the premod DMD is capable of >1800:1 CR, with the premod pixels off, the black level could be much better than 1/45000 of peak white; however turning off all of the premod pixels can have deleterious effects. These effects are also present in the images at low light levels, even with some pixels on. For example, some image features vary with spatial frequencies beyond those that can be represented by the premod light field. For these image features, the premod light field will be constant, un-modulated. The level of the premod light field will be determined by local max of the image feature. The primary DMD must reduce the premod light field to produce all levels of the local image feature. Depending on the first nonzero premod level, the primary DMD might not have sufficient contrast to produce the lowest levels, limiting the local contrast of that image feature enough to affect its appearance. This is especially critical around the area where the last pixels on the premod tiles are turned off. In this area the local contrast goes down to around 20. These issues could be resolved by increasing the size of the PSF and tile, but this would increase the halo size, which also can produce visible artifacts.

Figure 1:
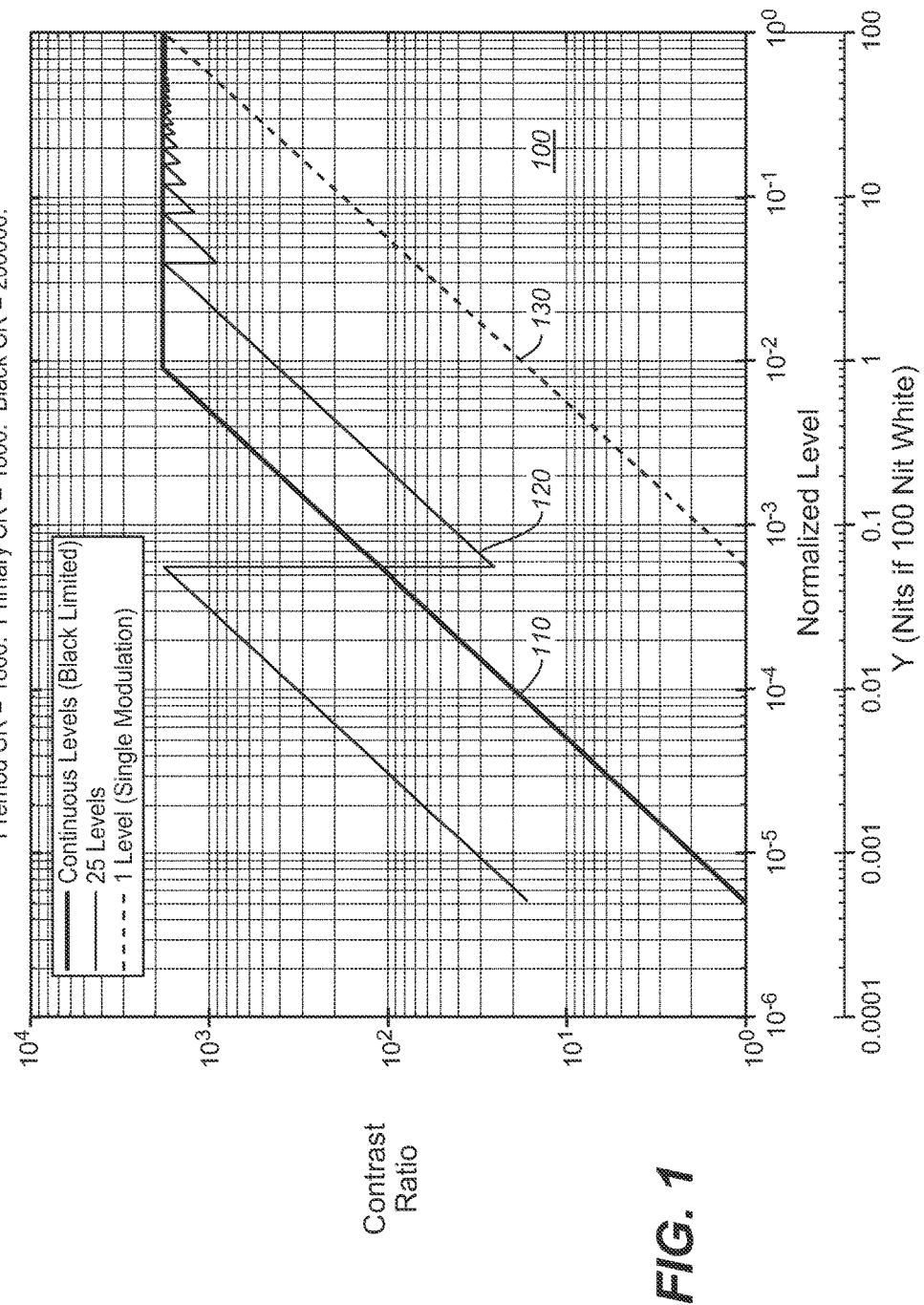
FIG. 1 is an illustration of the effects of the number of discrete pre-modulation levels on local contrast.

FIG. 1 helps illustrate the issues. The blue line (starting on the horizontal axis between 10E-6 and 10E-5) represents the best Contrast Ratio that could be achieved in this particular auditorium with an ideal infinite contrast ratio 100 nit capable projector. This limit is caused because the room has a dark level of 0.0005 nits as measured at the screen. This is from ambient room light in the room that reaches and is reflected from the screen to the viewer. The red line (starting on the horizontal axis between 10E-4 and 10E-3) represents a single modulation projector. The projector has an 1800:1 contrast ratio (simultaneous and sequential). As the peak level of the local image gets darker with this projector, the contrast ratio in the local image decreases proportionally because the dark level is constant. This is normal and expected behavior.

The light green line (the thinner line) represents the contrast ratio possible with a dual modulation projector with high spatial frequency components (where the premod is locally constant). As the projected image gets locally darker just out of peak white, the contrast ratio curve matches exactly the previous case. However, when the level reaches (in this example) about 24/25 of peak white, the premod can change its value from 25/25 to 24/25 pixels on, and the primary modulator can again use its full range. Thus, for this lower light level we again have full 1800:1 local contrast ratio. For the situation just before the premod changed its value (to 23/25), the local contrast ratio would be reduced to 24/25*1800. This situation proceeds through each change in the premod, with the possible CR resetting back up to 1800 after each change. For example when 2 pixels are active, the CR goes down to 144 (2/25*1800). When only a single pixel is active, the premod cannot change until the leakage light through the pre-modular is high enough to achieve the desired output level with the primary modulator alone (full on). In the illustrative example, this level is 1/1800 of the output peak. There is a large gap between the lowest modulation level achieved by the half-ton at 1/25, and 1/1800, and in this zone the premod must be kept at the 1/25 level. The primary modulator is the sole modulator for this region, and the contrast ratio falls to a level of about 1/25 before the premod halftone can be set to zero. This level is significantly lower (below the blue line by about a factor of 4) than what could be obtained in this room with an ideal projector.

One purpose of this invention is to reduce the effects of these artifacts by increasing the number of levels in the pre-modulator, but without increasing the tile size or PSF size. The concept is relatively simple; use more than a single halftone image per frame. In the earlier description a 5×5 tile was examined. The following describes using a 5×5 tile, but using 4 subframe halftones per frame. In this example, on an individual pixel basis for each tile, the pixel can take on a sequence of 5 values, these being 0, 1, 2, 3, or 4 subframes (0, ¼ frame, ½ frame, ¾ frame, or 1 frame). This allows the 5×5 tile to express 100 positive values (and 0) rather than the original 25 values (and 0). If a DMD (TI Digital Mirror Device) is used for the primary modulator, modification of the bit sequences for the modulation chips will be required. The DMD uses a form of pulse width modulation to modulate the light; therefore, the light is required to be constant during the entire frame period. Changing the pre-mod halftones during the frame (4 times) would produce a non-constant light, and interfere with the PWM result.

Normally the DMD is used with a single sequence per frame to obtain a 16 bit per pixel modulation. It is proposed to modify the bit sequence so that the higher order bits are spread across the frame period; therefore, they are repeated multiple times. For example, if the top 14 bits (of 16) are repeated, this would allow a pattern with the top 14 bits repeated 4 times. The lower significant bits would remain unaffected, (spread across the entire frame period). This type of repeated sequencing has been described in the literature and is used to reduce motion artifacts with DMD based projection systems. U.S. Pat. No. 5,986,640 describes a similar technique. The halftone image on the pre-modulator would be synchronized with the repeated sequences in the primary modulator such that both modulators would change to a new sequence at the same time.

Figure 2:
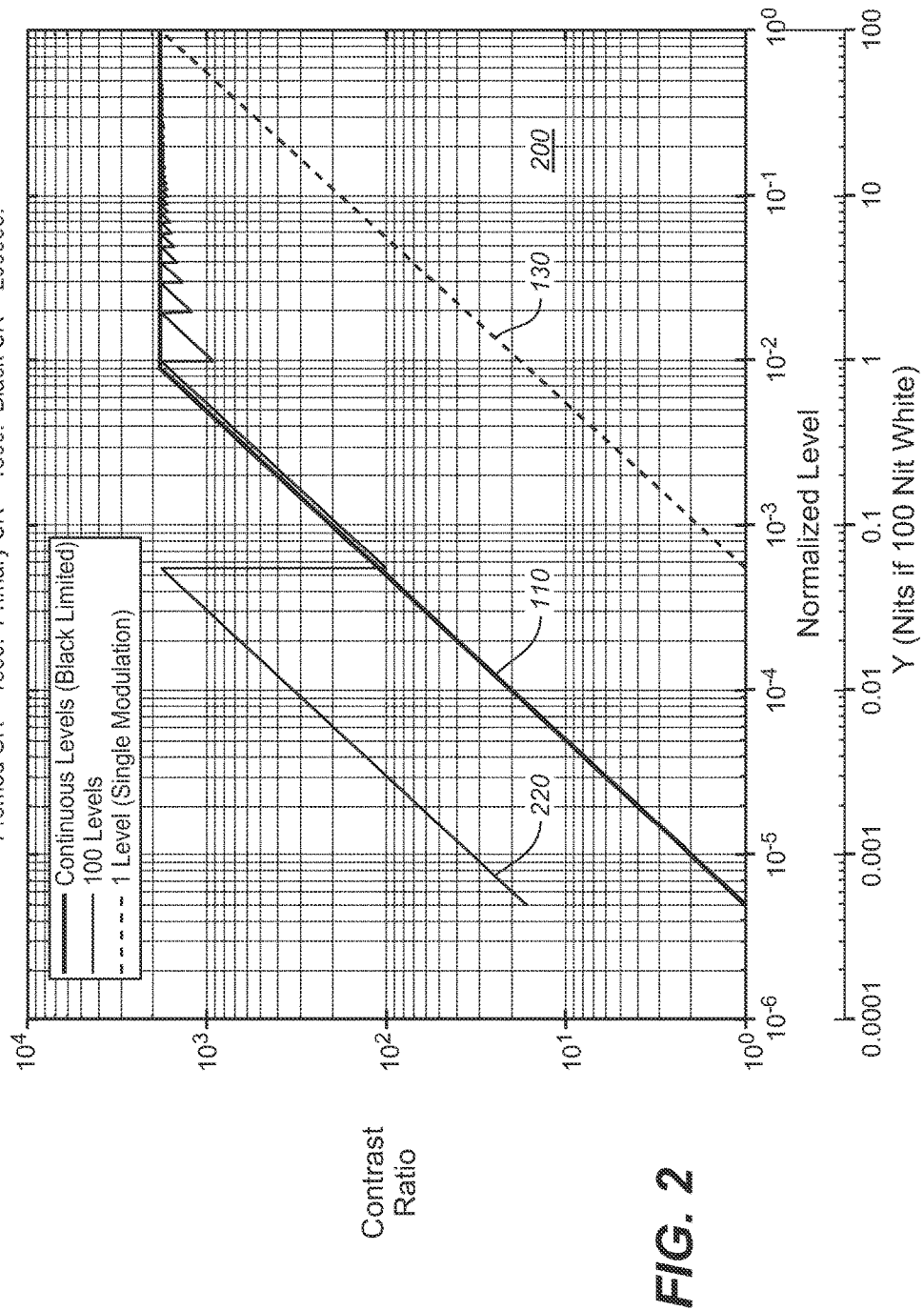
FIG. 2 is an illustration of improved results obtained when the halftone image is distributed across 4 subframes.

FIG. 2 illustrates the improved results obtained when the halftone image is distributed across 4 subframes as described above.

For this situation, the lowest contrast ratio from the projector is approximately equal to the results that could be obtained with an ideal projector in this room. This technique reduces the undesirable contrast ratio reduction without increasing tile size and corresponding PSF size.

The current dual modulation POC EDR projector uses a single half tone image per frame on the pre-modulator. A problem arises when the PSF of the relay optics between the two modulators is sub optimal, especially when the resultant PSF is multi-lobed, or non-monotonic in any direction. In order to compensate for sub-optimal PSFs with a single halftone image, the compensation is performed in the primary modulator. This can be done if the PSFs are reasonably well controlled across the frame and with the use of multiple PSFs within the dual modulation algorithm, and interpolation between PSFs across the frame. Ultimately, one could use a different PSF for every pixel within the frame, but this would create additional computation burden. In addition, the registration between the two modulators should be precise, and there are some limitations due to the limited contrast ratio of the primary modulator. Also, measurement or alignment errors may show up as high spatial frequency errors in the final image.

Figure 3:
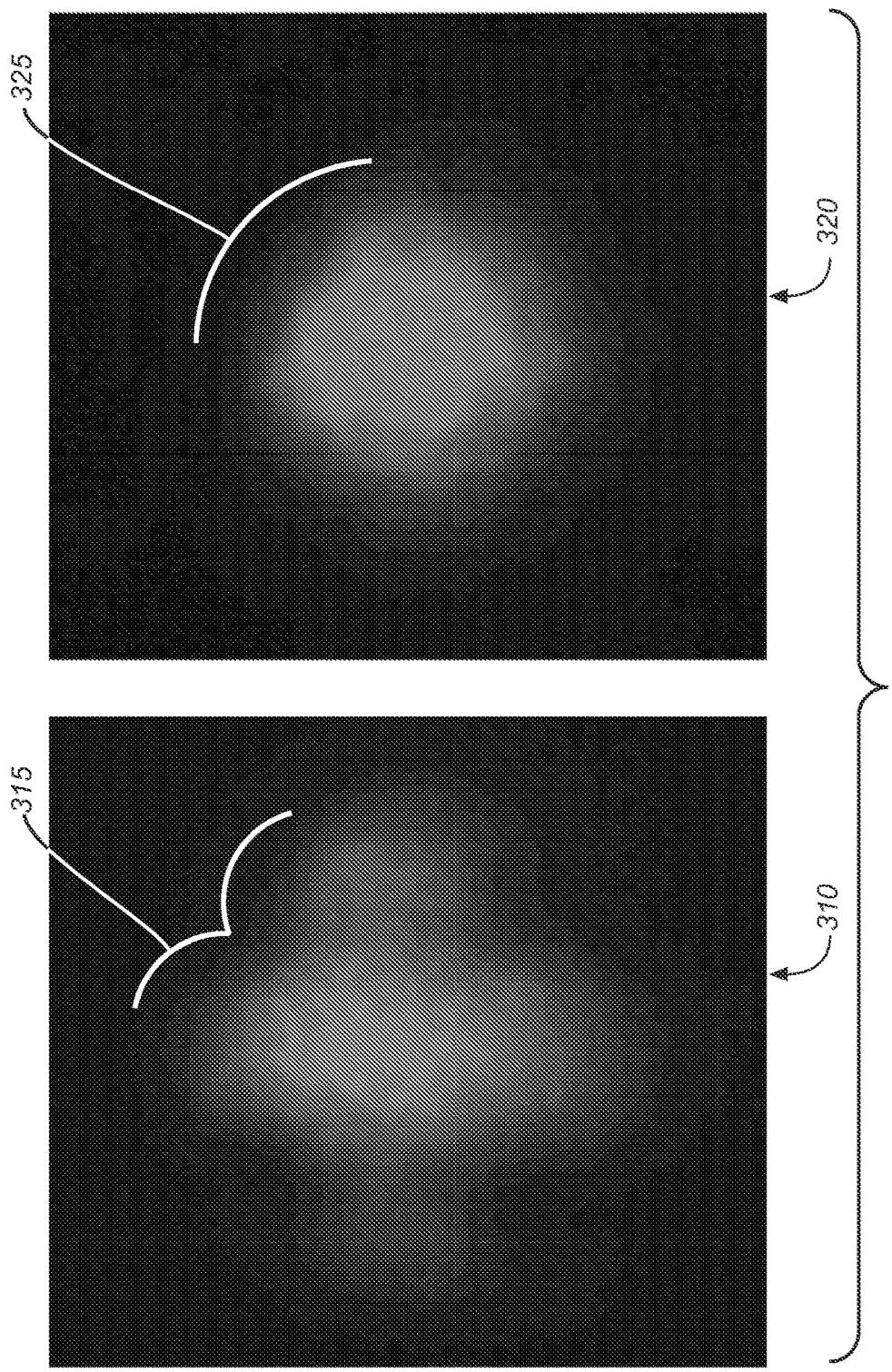
FIG. 3 is an illustration of an example PSF and a corrected PSF.

FIG. 3 shows a couple of examples of PSFs from the relay optics. The left PSF 310 is sub-optimal (with lobes 315), while the right PSF 320 is desirable (with more regular contour 325).

It would be better if the apparent PSF at the primary modulator was well controlled. One way of obtaining this is to average over several PSFs. As a practical matter, a single pixel turned on in the halftone image of the pre-modulator produces a small enough point to produce a point spread function on the primary modulator; thus the PSF can be measured on the projected image by turning the primary modulator to all white in the presence of single 'on' pixels in the pre-modulator.

Normally, in a dual modulation system we are rarely if ever turning on a single pixel in the pre-modulator, therefore multiple PSFs are typically present. If the PSFs are significantly larger than the tile size (which limits the highest spatial frequency that can be obtained) of the halftone image, one can obtain a PSF correction for the pre-modulator image which is used to generate the halftone image. The process may be implemented as:

1. Obtain 2D PSF of relay optics and its 2D Fourier Transform. rpsf(x,y), RPSF(wx,wy).
2. Specify desired PSF dpsf(x,y), DPSF(wx,wy).
3. Calculate the correction factor Zc(x,y)(wx,wy)=DPSF(wx,wy)/RPSF(wx,wy) for a large number of regions in the image, and interpolate to obtain a smoothly changing Zc as a function of x,y. Obtain inverse Fourier Transform of Zc(x,y)(wx,wy)=zc(x,y)(x,y).
4. Apply Zc to each region of the premod image. This might be best done in the location domain as Corrected Image Cl=zc convolved with the premod image.

These calculations determine a correction factor that filters the premodulator image in such a way that when combined with the PSF of the optics an image is produced where the inconsistencies of the optics PSF is smoothed to the desired psf. Of course, this only works if the relay optics PSFs are larger than the smallest feature that can be obtained from a halftone conversion of the premod image. This last point is important, as it limits the application of this approach to requiring large relay optics PSFs.

Addressing the halftone feature limitation requires an approach similar to that described above. In this implementation, instead of increasing the number of levels for the halftone image, we could use the same technique to decrease the size of the halftone tiles, so that the feature size was reduced.

As an example, let us assume that we originally had a 4×4 tile (16 levels), and we now divide the picture frame into 4 sub-frames. The tile size can now be reduced to 2×2 and still obtain 16 levels. The feature resolution in the halftone image has doubled, allowing smaller relay optics PSFs to be compensated.

The amount of effort to compensate for the PSFs has not reduced from the original design where all of the correction was done in the primary modulator, however, this approach reduces the visibility of errors caused by misalignment and measurement error verses the original approach using the primary modulator. These errors are translated into low frequency type errors which have lower visibility.

As described above, if a DMD (TI Digital Mirror Device) is used for the primary modulator, modification of the bit sequences for the modulation chips will be required. The DMD uses a form of pulse width modulation to modulate the light; therefore, the light is required to be constant during the entire frame period. Changing the pre-mod halftones during the frame (4 times) would produce a non-constant light, and interfere with the PWM result.

Normally the DMD is used with a single sequence per frame to obtain a 16 bit per pixel modulation. It is proposed to modify the bit sequence so that the higher order bits are spread across the frame period; therefore, they are repeated multiple times. For example, if the top 14 bits (of 16) are repeated, this would allow a pattern with the top 14 bits repeated 4 times. The lower significant bits would remain unaffected, (spread across the entire frame period). This type of repeated sequencing has been described in the literature and is used to reduce motion artifacts with DMD based projection systems. U.S. Pat. No. 5,986,640 describes a similar technique. The halftone image on the pre-modulator would be synchronized with the repeated sequences in the primary modulator such that both modulators would change to a new sequence at the same time.

Figure 4:
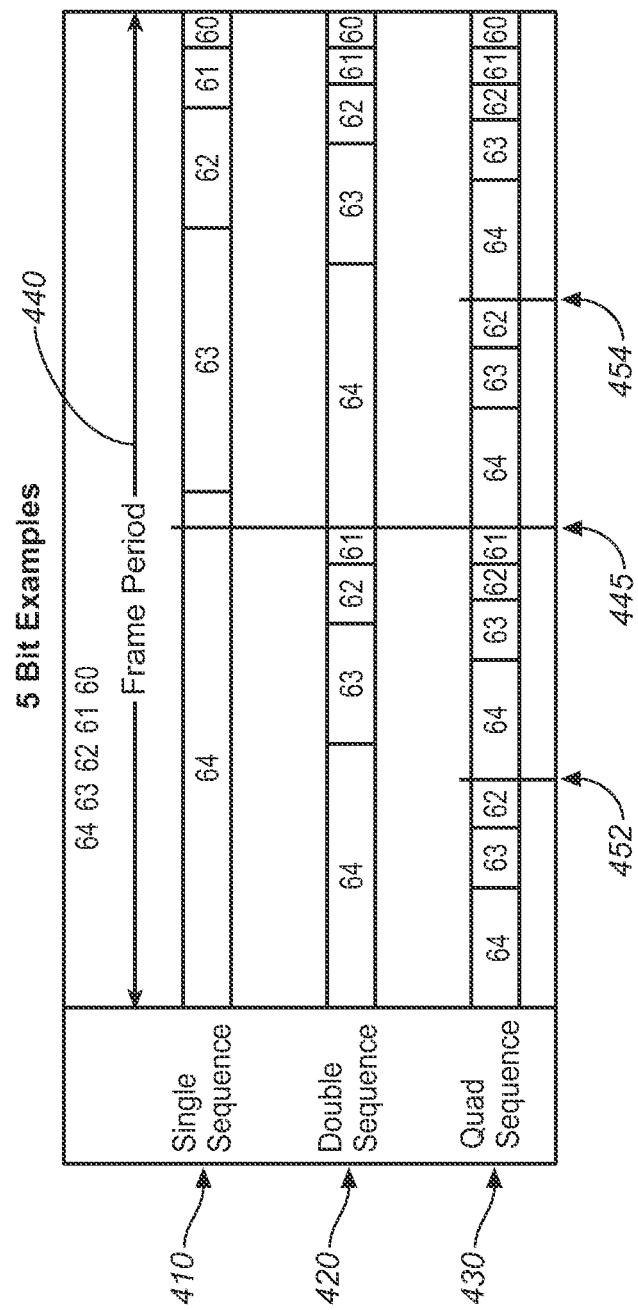
FIG. 4 is a diagram of an example bit sequence.

A proposed sequence that could operate under the requirements of the present invention is illustrated in FIG. 4.

The single sequence 410 illustrates a standard half-tome only modulator sequence for a single frame 440. The double sequence 420 illustrates the single sequence divided into two partitions for the frame 445. The quad sequence 430 illustrates the single sequence divided into four partitions for the frame (e.g., 452, 445, 454). The divided sequences are, for example, provided different bit sequences representing different half-tone images applied to the same frame (and, for example, the same primary modulator image). The divided sequences may alternate between a first and second halftone image. The divided sequences may implement a rotating sequential application of first, second, and third half-tone images for each frame. The half-tone images implemented for each frame include, for example, compensation of relay optics or other variations as described above. Based on the above disclosure, many other sequences may be developed, customized, synchronized or chained together to perform the same result, any one or more of which may be implemented together or separately in conjunction with any other aspect (or aspects) of the present invention.

The pre-modulator is preferably illuminated by laser light sources and the compensation of the pre-modulator image preferably compensates for wavelength specific aspects of the relay optics. Preferably, the result is a PSF of each pixel (or groups of pixels) for each of the half-tone images that are similarly shaped and varying smoothly from one-pixel to the next. The shapes of the PSFs in groups of pixels in regions of the image being modulated are the same or similar and any differences between PSFs of neighboring regions may, preferably, smoothly transition from the first region's preferred PSF to the adjoining region's preferred PSF. For 3D projections, the premodulator image is compensated to account for wavelength differences and associated wavelength dependent PSF changes between different colors (or different wavelengths) of the same or different viewing channels (e.g., left and/or right eye viewing channels), and/or similar differences/changes in the same colors (different wavelengths) of different or same viewing channels.

In various embodiments, the present invention may be a dual modulation projector containing a pre modulator, relay optics, and a primary modulator, and where pre-compensation for imperfections of the relay optics PSF is made by modifying the image sent to the pre modulator. The pre-compensation filter is different for different regions of the image. The precompensation filter coefficients may be calculated based upon PSF measurements and a reference desired PSF. Additional compensation is made in the primary modulator. The pre-modulator image may be a halftone image on a DMD, and the primary modulator may be a DMD. The halftone image may be changed multiple times per frame, and where the bit sequences on the pre-modulator DMD and primary modulator DMD are synchronized, such that the average across the frame is the product of the average of the pre-modulator images through the relay optics and the primary modulator image.

The present invention may comprise a projector comprising a pre-modulator to modulate light into a first image, a primary modulator configured to further modulate the light to produce a desired image, and relay optics configured to transfer the modulated light of the first image to the primary modulator, wherein the transfer optics are further configured to spread pixels of the first image so that each pixel of the first image illuminates a plurality of pixels of the primary modulator. The invention may further comprise a controller configured to energize the first modulator with a backlight image based on image data of the desired image, the backlight image further comprising an adjustment of pixels of the backlight image to compensate for non-uniformity on the primary modulator of one or more of the first image pixels. The compensation may comprise a difference between a desired point spread function of light transferred from the pre-modulator to the primary modulator and a PSF and/or MTF of the relay optics. The backlight (or premodulator) image comprises a convolution of a low resolution version of the desired image and the difference. The compensation may comprise a compensation scheme selected from a plurality of compensation schemes based on the desired image. The compensation may comprise a non-linear equation adjusted based on the desired image. The compensation may comprise a compensation scheme selected or derived based on a spatial frequency parameter of the image and a wavelength of light being modulated. The compensation may comprise one or a combination of a plurality of compensation schemes applied to different portions of the backlight image.

A projector according to the invention may comprise a multi-color channel projector each channel comprising a similar configuration of a pre-modulator, primary modulator, and transfer optics, said controller energizing each pre-modulator with image data comprising a backlight image for each color channel along with a color specific compensation. The compensation may comprise an inverse of a non-uniformity of spreading of pixels of the pre-modulator onto multiple pixels of the primary modulator according to wavelengths of light modulated in each channel. The first modulator may comprise one of a transmissive modulator and a reflective modulator, and the primary modulator comprises one of a transmissive modulator and a reflective modulator, and the first modulator and second modulator are not necessarily the same type of modulator.

Projectors according to the present invention may comprise modulators of different types or the pre-modulator and primary modulators are both DMD modulators. The pre-modulator and primary modulators may be Liquid-Crystal-on-Silicon (LCoS) modulators. Any of the projectors may be configured for projecting 3D images such as wherein the pre-modulator images comprise 1st and 2nd channel images of a 3D image, and the premodulator may be energized by compensated pre-modulator images comprising left and right images of a 3D image, and wherein the projector is part of a system for displaying an viewing 3D images comprising glasses comprising filters corresponding to the left and right images comprising filter passbands encompassing wavelengths of the left and right images.

In the 3D embodiments, the wavelengths of the left image may originate, for example, from a laser light source illuminating a pre-modulator while being energized with a compensated pre-modulator left image corresponding the illuminating wavelengths in a left image time frame; wavelengths of the right image originate from a laser light source illuminating the pre-modulator while being energized with a compensated pre-modulator right image corresponding to the illuminating wavelengths in a right image time frame.

The projectors of the present invention in multi-view and/or 3D embodiments may be, for example, part of a system for displaying and viewing 3D images and the modulated desired images are passed via wavelength selective filters in 3D viewing glasses such that modulated wavelengths of the left images of the 3D images are passed by a left filter of the 3D viewing glasses and modulated wavelengths of the right images of the 3D images are passed by a right filter of the 3D viewing glasses and the filters comprise passbands that are offset relative to the wavelengths being viewed through the passbands such that wavelengths of the compensated half-tone images further modulated into desired left and right images by the primary modulator are passed via passbands that encompass and are shifted toward longer wavelengths compared to the wavelengths of the intended image wavelengths passed through the passbands. Such arrangement allow for capturing laser wavelengths part of compensated half-tone images further modulated for viewing at oblique angles.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention. All other described items, including, but not limited to modulators, frames, sub-frames, etc. should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, preparing half-tone images corresponding to image data, dividing frames, synchronizing and applying bit sequences to DMDs, and the display, storage, or communication of results according to the processes of the present invention.

The present invention may suitably comprise, consist of, or consist essentially of, any of element (the various parts or features of the invention and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method for preparing dual modulation energization signals for a dual modulation display comprising a light source illuminating a pre-modulator, a set of relay optics transmitting the light from the pre-modulator to a primary modulator, the method comprising:
   determining a set of pre-modulator energization signals, the signals applied for more than one time period per single frame, whereby each pre-modulator energization signals induces the pre-modulator to create a plurality of half-tone images to be displayed or energized on a pre-modulator of a dual modulation display system over a plurality of sub-frames time periods during a single frame time period, such that the plurality of half-tone images that produces a desired Point Spread Function (PSF) that compensates for imperfections in the set of relay optics, wherein further the single frame period is a modulation period of the primary modulator and the sub-frame time period is a modulation period of the pre-modulator and the pixel elements of the primary modulator are switched on/off once during the single frame period and the pixel elements of the pre-modulator are switched on/off once during a single sub-frame period and further that the single frame period comprises a plurality of sub-frame time periods;
   determining a set of primary modulator signals, the primary modulator signals energized in synchronization with the pre-modulator energization signals to produce an image to be displayed or energized on a primary modulator of the dual modulation display system.

2. The method according to claim 1, wherein the half tone images are each displayed in a plurality of sub-frame time period each synchronized with the primary modulator signal.

3. The method according to claim 1, wherein the pre-modulator signal is divided into a plurality of sub-frame images each sub-frame image energized in its own sub-frame time interval each sub-frame time interval synchronized with an interval of energization of the primary modulator and the primary modulator signal.

4. The method according to any of claim 1 wherein the method is implemented in a cinema projector having laser light sources illuminating the premodulator.

5. The method according to claim 4, wherein the laser light sources are locally and globally modulated.

6. The method according to claim 4, wherein the laser light sources are configured to emit at least 2 sets of light wavelengths each set comprising red, green, and blue wavelength lights wherein at least one of the same color wavelengths in different sets are separated by a minimum bandwidth necessary to accomplish off-axis viewing without cross-talk through passbands of viewing glasses at normal and off-axis viewing.

7. The method according to claim 6, wherein the off-axis viewing is one of approximately 20 degrees.

8. A display device comprising a dual modulation architecture, comprising:
   a pre-modulator configured to produce a low resolution image comprising pixels each pixel comprising a plurality of modulating elements of the first modulator, the pixels together forming the low resolution image;
   a set of relay optics configured to transmit light from the pre-modulator, the relay optics comprising a given transfer function that include imperfections whereby the pre-modulator is energized by a set of pre-modulator energization signals that produce a plurality of half-tone images to be displayed or energized on a pre-modulator of a dual modulation display system over a plurality of sub-frames time periods during a single frame time period that compensate for the imperfections of the relay optics, wherein further the single frame period is a modulation period of the primary modulator and the sub-frame time period is a modulation period of the pre-modulator and the pixel elements of the primary modulator are switched on/off once during the single frame period and the pixel elements of the pre-modulator are switched on/off once during a single sub-frame period and further that the single frame period comprises a plurality of sub-frame time periods;
   a primary modulator comprising a plurality of modulating element configured to further modulate the light transmitted from the set of relay optics with a set of primary modulator energization signals working in synchronization with the pre-modulator energization signals so as to produce a desired image for display.

9. The display device according to claim 8, further comprising a controller configured to calculate a light field of the compensated low resolution image at the primary modulator and utilize the light field simulation to calculate drive values of the primary modulator.

10. The display device according to claim 8, wherein the light field simulation and primary modulator drive values are calculated for each of separate light channels of the display.

11. The display according to claim 8, wherein the display is a projector and the pre-modulator comprises a series of at least three modulating devices each modulating device assigned to a different color light channel.

12. The display according to claim 8, wherein a black level of the image for display is better than 1/45000th off-white, when at least one of a desired number of premodulator pixels are turned on when placed in a grid fashion to create a PSF.

13. The display according to claim 11, wherein the premodulator has at least 25 brightness levels and greater than 1800:1 contrast ratio.

14. The display according to claim 8, wherein the display is a projector and the image to be displayed passes through a projection lens onto a screen for viewing by a viewer.

15. The display according to claim 14, wherein dark level performance of the projector influenced mostly by a dark level of a room where the projector is utilized.

16. The display according to claim 9, wherein the controller changes a ratio of premodulator pixels and/or contrast ratio depending on brightness levels in the image to be displayed.

17. The display according to claim 9, wherein the controller is configured to shift a brightness range of a local area of the premodulator based on a brightness of a corresponding area the image to be displayed such that the primary modulator continues to use its full fidelity range throughout the corresponding area of the region.

18. The display according to claim 9, wherein the controller is configured to set-up a plurality of half-tone settings on the premodulator for each image to be displayed.

19. The display according to claim 18, wherein each halftone image comprises an n×n block of half tones each block comprising a pixel of the halftone image.

20. The display according to claim 19, wherein the controller adjusts the half tone images so as to shift a brightness range of a local area of the premodulator based on a brightness of a corresponding area the image to be displayed such that the primary modulator continues to use its full fidelity range throughout the corresponding area of the region.

* * * * *